Aug. 29, 1950  A. A. HANSON, JR  2,520,681
CAUTION SIGNAL SWITCH FOR MOTOR VEHICLES
Filed Nov. 12, 1948
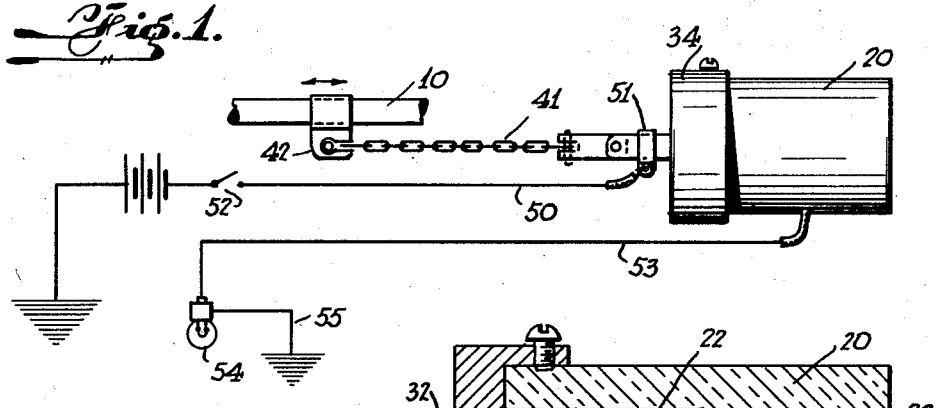
Fig. 1.
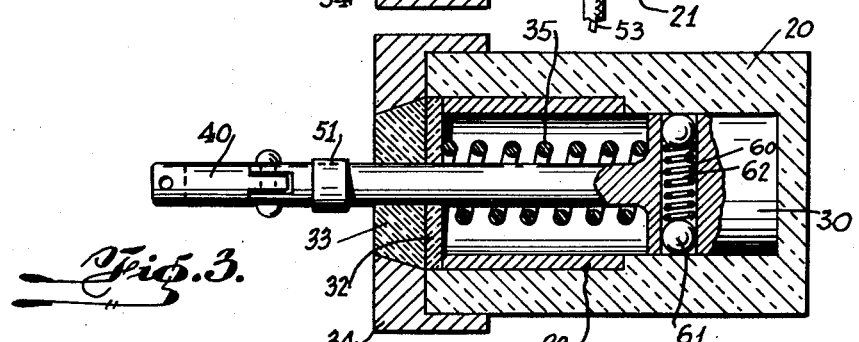
Fig. 2.
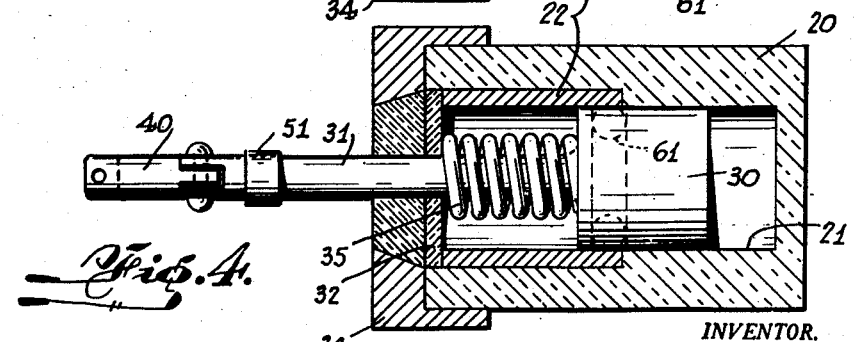
Fig. 3.
Fig. 4.
INVENTOR.
ALEXANDER A. HANSON, JR.
BY
Samuel J. Stoll
ATTORNEY.

Patented Aug. 29, 1950

2,520,681

UNITED STATES PATENT OFFICE 2,520,681

CAUTION SIGNAL SWITCH FOR MOTOR VEHICLES

Alexander A. Hanson, Jr., Lynbrook, N. Y.

Application November 12, 1948, Serial No. 59,452

3 Claims. (Cl. 200—161)

This invention relates to a caution signalling switch for motor vehicles.

Motor vehicles are conventionally equipped with stop lights and other stop signalling devices to signal the driver's intention to stop the vehicle. These signalling devices are connected directly or indirectly to the brake system of the vehicle and they are actuated when the driver applies his foot to the brake pedal. A time interval necessarily occurs between the time the motor vehicle driver releases the accelerator and the time he engages the brake pedal. This time interval therefore, necessarily coincides with the time lost in apprising the operators of the motor vehicles behind of the intention of the driver of the leading motor vehicle to apply his brakes and either to slow down or to come to a complete stop. It is this time loss that is frequently productive of collisions between the lead motor vehicle and the motor vehicle which follows it.

The present invention is of a caution signalling switch mechanism which is connected to the accelerator or throttle of the motor vehicle. It is actuated when the driver releases the accelerator and it does not await the application of the vehicle's brakes. Hence the time interval that occurs between releasing the accelerator and applying the brakes is no longer a lost time interval. Full and adequate use is made of said time interval in signalling the motor vehicles behind that the driver of the leading motor vehicle is no longer feeding fuel to the engine and that by reason thereof, deceleration is setting in. In other words, use is made of the previously lost time interval to apprise the drivers of the motor vehicles behind that the driver of the leading motor vehicle has removed his foot from the accelerator and is probably about to apply it to the brake pedal to further decelerate his said motor vehicle or even to bring it to a complete stop.

Warning signal mechanisms of this general character have heretofore been devised but none, to the applicant's knowledge, has been a practical device from the point of view of its operation as well as from the point of view of its installation into conventional motor vehicles. The signalling devices heretofore devised have been rather complicated in their structure and inefficient and doubtful in their performance. They have been found to be very difficult to install and, indeed, in some cases installation has been found to be virtually impossible.

It is accordingly the principal object of this invention to provide a caution signal switch mechanism of the character described which is simple and compact in its construction and which is readily and easily installable into any conventional motor vehicle whether of the pleasure or business type. More specifically, the switch of the present invention may be installed by simply hooking it up to the throttle rod, thereby causing its caution light to be energized when the throttle rod moves in one direction (to decelerate the motor vehicle) and causing the said light to be de-energized when the throttle rod moves in the opposite direction to accelerate the motor vehicle.

Briefly, the switch mechanism herein claimed comprises an insulated cylinder, a short sleeve in said cylinder, and a piston movably mounted in said cylinder into and out of engagement with said sleeve, the piston rod being connected to the throttle rod and to the electrical system of the motor vehicle. The sleeve is connected to the warning light and said light is also connected to the electrical system of the motor vehicle. The circuit to said warning light is closed when the throttle rod holds the piston into engagement with said sleeve and the circuit is broken when the throttle rod moves in the opposite direction and the piston is moved out of engagement with said sleeve. The instrumentality that moves the piston in said opposite direction, out of engagement with said sleeve, may be a compression spring as shown in the drawing.

A preferred form of this invention is shown by way of illustration in the accompanying drawing in which:

Fig. 1 is a side view of the switch mechanism herein claimed, showing how it is attached to the throttle rod of a motor vehicle and showing, schematically, how it is connected to the electrical system of the motor vehicle and to the caution light;

Fig. 2 is a vertical section therethrough;

Fig. 3 is a horizontal section therethrough; and

Fig. 4 is a view similar to that of Fig. 3 showing the movable piston in contact with the fixed sleeve to complete the circuit and energize the caution light.

The throttle rod 10 is connected to the carburetor of the motor vehicle in the usual manner. It is movable to the right, as seen in Fig. 1, to accelerate the vehicle and it is movable to the left to decelerate it.

The switch mechanism of the present invention includes a housing 20 which is attached to the motor vehicle in the general vicinity of the throttle rod 10 and more especially in such position relative to said rod as it is shown to occupy in Fig. 1. This housing is made of material which is non-conductive to electric current.

The housing has a cylindrical hole 21 formed therein longitudinally thereof. This hole has an enlarged portion which accommodates a sleeve 22 disposed concentrically therewith. The inner surface of the smaller portion of hole 21 and the inner surface of sleeve 22 are continuous with each other to provide an unbroken cylindrical wall in housing 20. Except for an air vent or escape hole 23, hole 21 is closed at one end and is completely open at the opposite end. A wall 24 is formed at one end of housing 20 to close hole 21 at that end but the housing is not provided with a similar wall at its opposite end. Unlike housing 20, sleeve 22 is made of material which readily conducts electric current. Housing 20 may be made, for example, of plastic material whereas sleeve 22 may be made of bronze or brass or similarly conductive material, such as steel.

Slidably mounted in hole 21 is a piston 30 to which a piston rod 31 is attached. This piston is movable longitudinally of hole 21 and it is also movable into sleeve 22 since the inner surfaces of the smaller portion of hole 21 and of sleeve 22 are continuous with each other. At the open end of hole 21 are a washer 32 and a retaining ring 33. The retaining ring holds the washer in place against sleeve 22 and a cap 34 fixed to housing 20 holds the retaining ring in place. Washer 32 and retaining ring 33 are also non-conductive with respect to electric current. Both the washer and the ring are provided with centrally extending and registering holes which are co-axial with hole 21 and sleeve 22. Extending through said holes is the piston rod 31. A compression spring 35 is mounted on said rod and it bears at one end against the piston and at its opposite end against washer 32. This spring acts, therefore, to urge the piston toward the closed end of the housing and in so doing, it tends to draw the piston rod into said housing. It will be understood, therefore, that when the piston rod is caused to move in the opposite direction, that is to the left as seen in the drawing, that movement is against the action of the compression spring, since the piston moves integrally with said rod against said spring. Like sleeve 22, the piston and its rod are made of material which readily conducts electric current.

It will be noted that the outer end of piston rod 31 is connected to throttle rod 10 by means of a pivotally connected link 40, a chain 41 and a clamp 42. The clamp is fastened to the piston rod and it is connected to one end of the chain. The opposite end of the chain is connected to link 40 which in turn is connected to said piston rod.

The normal or inactive position of the piston is as far over to the right as it will go that is, in abutment with wall 24. Vent 23 in said wall permits such movement since it enables the piston to evacuate the air contained in the cylinder. See Fig. 2. When the accelerator is released, however, the throttle rod 10 moves leftwardly, pulling the piston rod and hence the piston with it to the position which they are shown to occupy in Fig. 4. It will, therefore, be seen that the piston has moved leftwardly in hole 21 until it has entered sleeve 22. Spring 35 is now in compressed or loaded condition. When the accelerator is once again depressed or actuated, the throttle rod moves toward the right and thereby frees the piston and piston rod for corresponding movement toward the right in response to the action of compression spring 35 thereon.

A conductor 50 is connected to the outer end of piston rod 31 by means of a clamp 51. Conductor 50 is connected at its opposite end to a switch 52 and to the battery of the motor vehicle. A second conductor 53 extends through a hole in housing 20 and is connected to sleeve 22 in said housing. See Fig. 2. This second conductor is connected at its opposite end to a caution signal such as an electric light bulb 54. Another conductor 55 grounds said bulb.

When switch 52 is closed and piston 30 moves into contact with sleeve 22 an electric circuit is closed which comprises the following elements: the battery, switch 52, conductor 50, clamp 51, piston rod 31, piston 30, sleeve 22, conductor 53, bulb 54 and grounded conductor 55. Hence, when the throttle rod moves leftwardly (to decelerate the motor vehicle) and thereby drags piston 30 into engagement with sleeve 22, the circuit to said bulb 54 is closed and said bulb is thereby energized. Conversely, when the motor vehicle is accelerated and the throttle rod moves toward the right, piston 30 moves out of engagement with sleeve 22, thereby breaking the circuit and de-energizing said bulb 54.

The switch 52 hereinabove described may be the ignition switch of the motor vehicle or it may be a separate and independent switch installed solely for the purpose of the present invention.

To insure adequate contact between the piston and the sleeve, irrespective of the extent of the clearance between said piston and said sleeve, a transversely extending hole 60 is formed in said piston and a pair of balls 61 with a compression spring 62 between them is mounted in said hole. The spring tends to urge the two balls radially outwardly and into contact, therefore, with the inner wall of the housing or with the inner wall of the sleeve in said housing, depending upon the relative position of the piston. In Fig. 3 the balls are shown in contact with the housing wall whereas in Fig. 4 they are shown in contact with the sleeves. These balls are also in contact with the wall of transverse hole 60 and hence with the piston proper. Therefore when they are brought into engagement with sleeve 22 they serve to close the circuit aforementioned equally as well as the piston itself if the piston were in direct contact with the sleeve.

It will be evident from the foregoing that a highly efficient caution signal switch mechanism is herein provided which is very easily installable in conventional motor vehicles without special tools or equipment. The form of the invention hereinabove described is a preferred form only and it may be modified in numerous ways within the broad scope and spirit of the invention.

I claim:

1. A switch mechanism, comprising a hollow, cylindrical housing which is open at one end and closed at its opposite end, a bushing mounted in its open end, an annular recess formed on the inside of the cylindrical housing adjacent the bushing, a sleeve mounted in said recess, the inner walls of said sleeve and said cylindrical housing being flush and continuous with each other, a piston slidably mounted within said cylindrical housing for movement into and out of said sleeve, a piston rod slidably supported by said bushing and connected to said piston, said piston rod projecting outwardly from said cylindrical housing through said bushing, a compression spring mounted on said piston rod and bearing at one end against said piston and at its opposite end against said bushing, whereby the piston is tensionally urged out of the sleeve and toward the closed end of the cylindrical housing, said housing and bushing being made of electrically non-conductive material and said piston, piston rod and sleeve being made of electrically conductive material, and electrical conductors connecting said sleeve and said piston rod to a source of electric current, whereby a circuit including said piston, piston rod, sleeve and source of current is made when the piston moves into contact with said sleeve, and whereby said circuit is broken when the piston moves out of contact with said sleeve.

2. A switch mechanism, in accordance with claim 1, wherein a transversely extending hole is formed in the piston and at least one ball is movably mounted in said hole, said ball being spring-urged outwardly from said hole into tensioned contact with the sleeve when the piston enters said sleeve, said spring-urged ball being electrically conductive to effect an adequate electric connection between said piston and said sleeve.

3. A switch mechanism, in accordance with claim 1, wherein the closed end of the cylindrical housing is provided with a vent to allow air to pass into and out of said cylindrical housing in accordance with the movements therein of the piston.

ALEXANDER A. HANSON, JR.

REFERENCES CITED

The following references are of record in the file of this patent:

UNITED STATES PATENTS

| Number | Name | Date |
|---|---|---|
| 763,613 | Keating | June 28, 1904 |
| 1,560,318 | Reed | Nov. 3, 1925 |
| 1,696,902 | Clerico | Jan. 1, 1929 |
| 1,873,141 | Norviel et al. | Aug. 23, 1932 |
| 1,956,056 | Bellec et al. | Apr. 24, 1934 |
| 2,096,069 | Seiden | Oct. 19, 1937 |
| 2,128,769 | Finnell | Aug. 30, 1938 |
| 2,339,910 | Centrella | Jan. 25, 1944 |